United States Patent
Mason

(10) Patent No.: US 9,352,397 B2
(45) Date of Patent: May 31, 2016

(54) LOCKING CHUCK

(71) Applicant: Apex Brands, Inc., Sparks, MD (US)

(72) Inventor: Neil Mason, Newcastle upon tyne (GB)

(73) Assignee: APEX BRANDS, INC., Apex, NC (US)

( * ) Notice: Subject to any disclaimer, the term of this patent is extended or adjusted under 35 U.S.C. 154(b) by 346 days.

(21) Appl. No.: 13/859,639

(22) Filed: Apr. 9, 2013

(65) Prior Publication Data

US 2013/0264782 A1 Oct. 10, 2013

Related U.S. Application Data

(60) Provisional application No. 61/622,314, filed on Apr. 10, 2012.

(51) Int. Cl.
*B23B 31/12* (2006.01)

(52) U.S. Cl.
CPC ............ *B23B 31/123* (2013.01); *B23B 31/1238* (2013.01); *B23B 2231/38* (2013.01); *B23B 2260/008* (2013.01); *Y10S 279/902* (2013.01); *Y10T 279/17623* (2015.01); *Y10T 279/17632* (2015.01); *Y10T 279/32* (2015.01)

(58) Field of Classification Search
CPC .............. B23B 31/123; B23B 31/1238; B23B 2231/38; B23B 2260/008; Y10T 279/17632; Y10T 279/32; Y10S 279/902
USPC ...................................... 279/60–65, 140, 902
See application file for complete search history.

(56) References Cited

U.S. PATENT DOCUMENTS

| | | | |
|---|---|---|---|
| 573,189 A | 12/1896 | Vogel | |
| 2,684,856 A | 7/1954 | Stoner | |
| 3,506,277 A | 4/1970 | Harms | |
| 3,545,776 A | 12/1970 | Haviland | |
| 4,230,327 A * | 10/1980 | Rohm | ............................ 279/61 |
| 4,277,074 A | 7/1981 | Kilberis | |

(Continued)

FOREIGN PATENT DOCUMENTS

| | | | |
|---|---|---|---|
| CN | 201815693 U | * | 5/2011 |
| CN | 202539611 | | 11/2012 |

(Continued)

OTHER PUBLICATIONS

U.K. Search Report dated Aug. 19, 2009 for Application No. GB0910573.5.

(Continued)

*Primary Examiner* — Eric A Gates

(74) *Attorney, Agent, or Firm* — Nelson Mullins Riley & Scarborough LLP

(57) ABSTRACT

A chuck including a body having a nose section, a tail section and a center axis, the nose section defining an axial bore and a plurality of passageways. A plurality of jaws is disposed in the passageways, a nut is rotatably mounted about the body so that rotation of the nut either moves the jaws toward or away from the center axis, and a sleeve that is rotatably mounted about the body, the sleeve being rotatable with respect to the nut between a first rotational position and a second rotational position. An annular array of locking teeth is non-rotatable with respect to one of the body and the nut. A lock ring includes at least three projections and is axially movable so that, when engaged, the projections and the locking teeth resist the lock ring from rotating in the opening direction with respect to the body.

20 Claims, 6 Drawing Sheets

(56) References Cited

U.S. PATENT DOCUMENTS

| | | | |
|---|---|---|---|
| 4,395,170 A | 7/1983 | Clarey | |
| 4,498,682 A | 2/1985 | Glore | |
| 4,526,497 A | 7/1985 | Hatfield | |
| 4,536,113 A | 8/1985 | Hatfield | |
| 4,583,751 A * | 4/1986 | Rohm | 279/140 |
| 4,607,855 A * | 8/1986 | Rohm | 279/62 |
| 4,655,464 A | 4/1987 | Manschitz et al. | |
| 4,660,841 A | 4/1987 | Chouinard | |
| 4,669,932 A | 6/1987 | Hartley | |
| 4,682,918 A | 7/1987 | Palm | |
| 4,695,065 A | 9/1987 | Komatsu et al. | |
| 4,700,956 A | 10/1987 | Rohm | |
| 4,703,942 A | 11/1987 | Rohm | |
| 4,840,387 A | 6/1989 | McCarthy | |
| 4,844,482 A | 7/1989 | Rohm | |
| 4,930,793 A | 6/1990 | Ando | |
| 4,951,955 A | 8/1990 | Sakamaki | |
| 4,955,623 A | 9/1990 | Rohm | |
| 4,958,840 A | 9/1990 | Palm | |
| 4,968,191 A | 11/1990 | Palm | |
| 5,009,439 A | 4/1991 | Sakamaki | |
| 5,044,643 A | 9/1991 | Nakamura | |
| 5,054,796 A * | 10/1991 | Rohm | 279/60 |
| 5,125,673 A | 6/1992 | Huff et al. | |
| 5,145,192 A | 9/1992 | Rohm | |
| 5,145,193 A | 9/1992 | Rohm | |
| 5,172,923 A | 12/1992 | Nakamura | |
| 5,174,588 A | 12/1992 | Reibetanz et al. | |
| 5,183,274 A | 2/1993 | Sakamaki | |
| 5,195,760 A | 3/1993 | Wheeler et al. | |
| 5,215,317 A | 6/1993 | Jordan et al. | |
| 5,234,223 A | 8/1993 | Sakamaki | |
| 5,236,206 A | 8/1993 | Rohm | |
| 5,286,041 A | 2/1994 | Rohm | |
| 5,330,204 A | 7/1994 | Huff et al. | |
| 5,375,857 A | 12/1994 | Rohm | |
| 5,375,858 A | 12/1994 | Rohm | |
| 5,407,215 A | 4/1995 | Yang | |
| 5,431,419 A | 7/1995 | Mack | |
| 5,435,578 A * | 7/1995 | Rohm | 279/62 |
| 5,452,906 A | 9/1995 | Huff et al. | |
| 5,464,230 A | 11/1995 | Rohm | |
| 5,499,829 A * | 3/1996 | Rohm | 279/62 |
| 5,531,549 A | 7/1996 | Fossella | |
| 5,573,254 A | 11/1996 | Huff et al. | |
| 5,615,899 A | 4/1997 | Sakamaki | |
| 5,624,125 A | 4/1997 | Rohm | |
| 5,765,839 A * | 6/1998 | Rohm | 279/62 |
| 5,826,888 A | 10/1998 | Weaver et al. | |
| 5,833,247 A | 11/1998 | Deuschle et al. | |
| 5,882,153 A | 3/1999 | Mack et al. | |
| 5,924,702 A | 7/1999 | Huff et al. | |
| 5,984,320 A * | 11/1999 | Nakamura | 279/62 |
| 5,988,653 A | 11/1999 | Kuo | |
| 5,992,859 A | 11/1999 | Lin | |
| 6,073,939 A | 6/2000 | Steadings et al. | |
| 6,179,301 B1 | 1/2001 | Steadings et al. | |
| 6,196,554 B1 | 3/2001 | Gaddis et al. | |
| 6,247,706 B1 | 6/2001 | Kuo | |
| 6,257,596 B1 | 7/2001 | Yang | |
| 6,260,856 B1 | 7/2001 | Temple-Wilson | |
| 6,302,407 B1 | 10/2001 | Hsueh | |
| 6,398,226 B1 | 6/2002 | Huggins et al. | |
| 6,409,181 B1 | 6/2002 | Hsueh | |
| 6,435,521 B2 | 8/2002 | Steadings et al. | |
| 6,488,287 B2 | 12/2002 | Gaddis et al. | |
| 6,517,088 B1 * | 2/2003 | Rohm | 279/62 |
| 6,550,785 B2 * | 4/2003 | Rohm | 279/62 |
| 6,729,812 B2 | 5/2004 | Yaksich et al. | |
| 6,832,764 B2 | 12/2004 | Steadings et al. | |
| 7,008,151 B2 * | 3/2006 | Yaksich et al. | 408/240 |
| 7,128,503 B2 | 10/2006 | Steadings et al. | |
| 7,296,803 B2 * | 11/2007 | Yang et al. | 279/62 |
| 7,360,770 B2 | 4/2008 | Luckenbaugh et al. | |
| 7,527,273 B2 | 5/2009 | Bordeianu | |
| 7,837,200 B2 | 11/2010 | Bordeianu | |
| 7,845,651 B2 | 12/2010 | Yaksich | |
| 7,946,594 B2 | 5/2011 | Tan | |
| 8,616,561 B2 * | 12/2013 | Mason | 279/62 |
| 2002/0130007 A1 * | 9/2002 | Nakamura et al. | 192/38 |
| 2006/0208433 A1 * | 9/2006 | Cachod | 279/63 |
| 2007/0052182 A1 * | 3/2007 | Bordeianu | 279/62 |
| 2007/0069484 A1 * | 3/2007 | Bordeianu | 279/62 |
| 2007/0252345 A1 * | 11/2007 | Cachod | 279/60 |
| 2008/0136124 A1 * | 6/2008 | Tan | 279/62 |
| 2009/0315279 A1 | 12/2009 | Yaksich | |
| 2010/0127464 A1 * | 5/2010 | Mack | 279/62 |
| 2010/0181735 A1 * | 7/2010 | Zhou et al. | 279/62 |
| 2011/0316240 A1 | 12/2011 | Yang | |
| 2014/0077463 A1 * | 3/2014 | Mason | 279/62 |
| 2014/0265163 A1 * | 9/2014 | Mason | 279/62 |

FOREIGN PATENT DOCUMENTS

| | | |
|---|---|---|
| DE | 3406668 | 9/1985 |
| DE | 3418881 | 11/1985 |
| DE | 3617105 | 11/1987 |
| DE | 3914311 | 6/1990 |
| DE | 4238503 | 11/1993 |
| DE | 19506708 | 3/1996 |
| EP | 0300375 | 1/1989 |
| EP | 0468128 | 1/1992 |
| EP | 0710518 | 5/1996 |
| EP | 0710519 | 5/1996 |
| EP | 0710520 | 5/1996 |
| EP | 1894651 | 3/2008 |
| JP | H01-92009 | 4/1989 |
| JP | H01-289608 | 11/1989 |
| JP | H03-49808 | 3/1991 |
| JP | H03-270809 | 12/1991 |
| JP | H04-365504 | 12/1992 |
| JP | H08-90316 | 4/1996 |
| WO | 2008122159 | 10/2008 |
| WO | 2010125887 | 11/2010 |

OTHER PUBLICATIONS

U.K. Office Action dated Mar. 7, 2012 for Application No. GB0910573.5.

Response to U.K. Office Action dated Mar. 7, 2012 for Application No. GB0910573.5.

Office Action dated May 21, 2012, for Chinese Application No. 200910173303.2.

Second Office Action dated Jan. 29, 2013 for Chinese Application No. 200910173303.2.

Office Action dated Jan. 31, 2013 for German Application No. 10 2009 025 487.0-14.

* cited by examiner

LOCKING CHUCK

CLAIM OF PRIORITY

This application claims priority to U.S. Provisional Patent Application No. 61/622,314 filed Apr. 10, 2012, the entire disclosure of which is incorporated by reference herein.

FIELD OF THE INVENTION

The present invention relates generally to chucks for use with drills or with electric or pneumatic power drivers. More particularly, the present invention relates to a chuck of the keyless type which may be tightened or loosened by hand or actuation of the driver motor.

BACKGROUND OF THE INVENTION

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways contain three jaws which are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached onto the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673 and 5,193,824, commonly assigned to the present assignee and the entire disclosures of which are incorporated by reference herein. Various configurations of keyless chucks are known in the art and are desirable for a variety of applications.

The present disclosure recognizes and addresses the foregoing considerations, and others, of prior art constructions and methods.

SUMMARY OF THE INVENTION

One embodiment of a chuck in accordance with the present disclosure includes a chuck for use with a manual or powered driver having a rotatable drive shaft. The chuck includes a generally cylindrical body having a nose section, a tail section and a center axis, the tail section being configured to rotate with the drive shaft and the nose section having an axial bore formed therein and a plurality of passageways formed therethrough and intersecting the axial bore. A plurality of jaws are movably disposed in the passageways. A nut is rotatably mounted about the body and in operative communication with the jaws so that rotation of the nut in a closing direction with respect to the body moves the jaws toward the center axis of the body and rotation of the nut in an opening direction with respect to the body moves the jaws away from the center axis of the body. A generally cylindrical sleeve is rotatably mounted about the body, the sleeve being in operative communication with the nut so that the sleeve rotationally drives the nut but is rotatable with respect to the nut between a first rotational position and a second rotational position. An annular array of locking teeth is non-rotatably fixed to the body and facing toward the tail section of the body. A lock ring includes an annular portion and at least three projections extending from the annular portion toward the nose section of the body and the locking teeth, the lock ring being non-rotatable with respect to the nut and axially movable with respect to the body, the projections and the locking teeth being configured so that when the projections engage the locking teeth, the projections and the locking teeth resist rotation of the lock ring in the opening direction with respect to the body. The projections are disengaged from the locking teeth when the sleeve is in the first rotational position and the projections engage the locking teeth when the sleeve is in the second rotational position.

The accompanying drawings, which are incorporated in and constitute a part of this specification, illustrate one embodiment of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
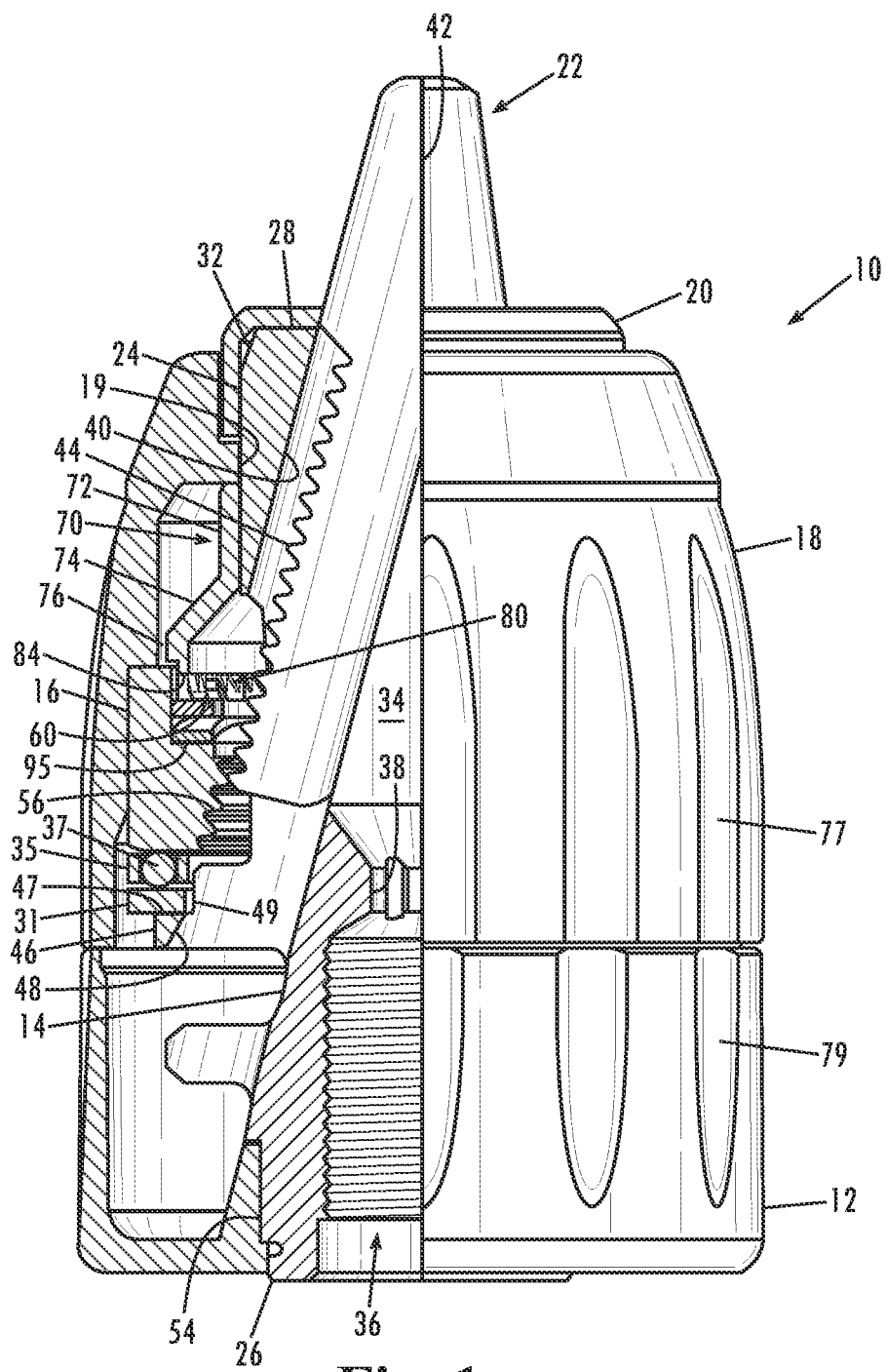
FIG. 1 is a longitudinal view, partly in section, of a chuck in accordance with an embodiment of the present disclosure.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the disclosure, one or more examples of which are illustrated in the accompanying drawings. Each example is provided by way of explanation of the invention, not limitation of the invention. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Figure 2:
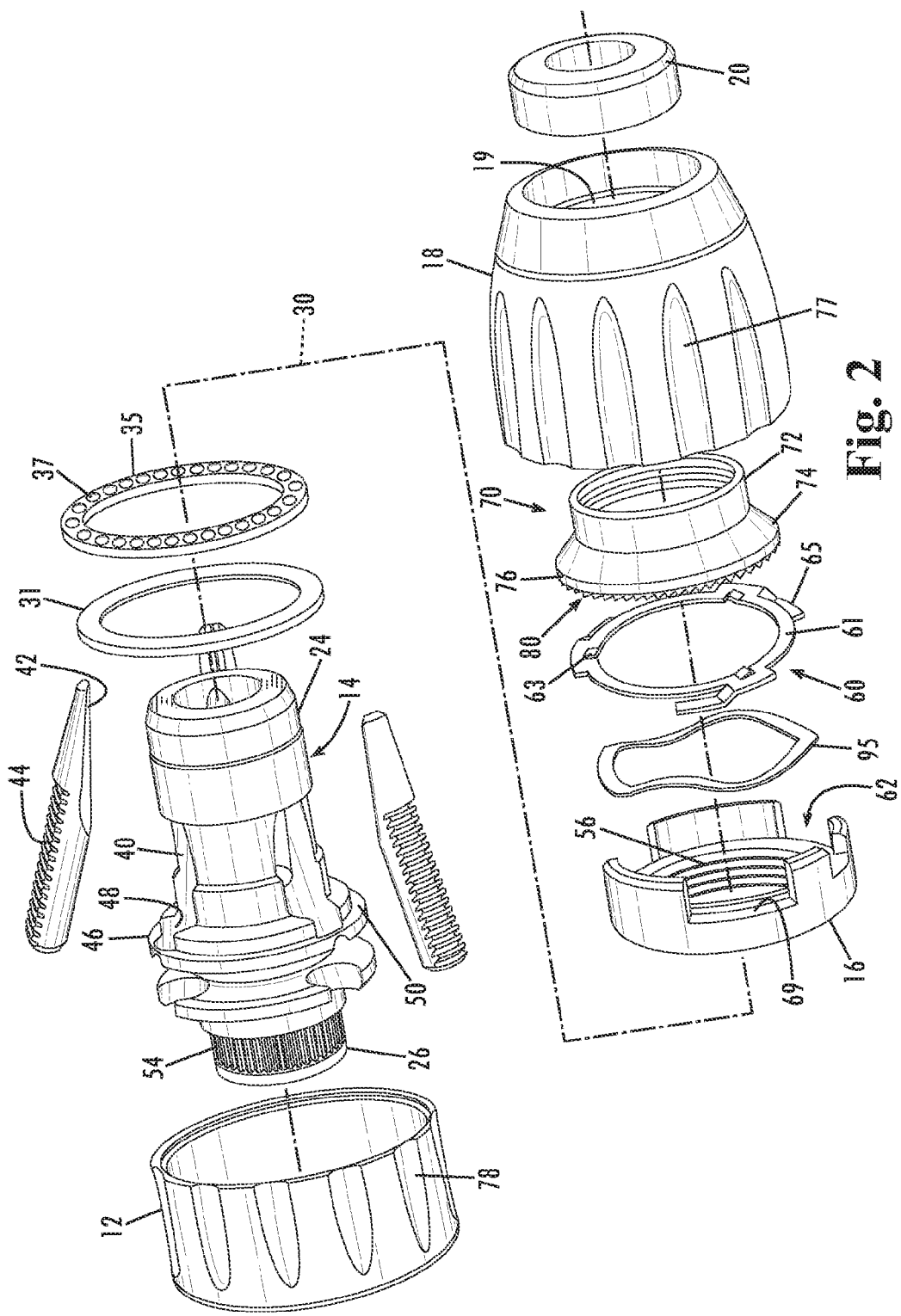
FIG. 2 is an exploded perspective view of a chuck as shown in FIG. 1.

Referring to FIGS. 1 and 2, a chuck 10 includes a body 14, a nut 16, a front sleeve 18, a nose piece 20, a nut retainer member 70 and a plurality of jaws 22. Body 14 is generally cylindrical in shape and comprises a nose or forward section 24 and a tail or rearward section 26. Nose section 24 has a front face 28 transverse to the longitudinal center axis 30 of body 14 and a tapered surface 32 at its forward end. The nose section defines an axial bore 34 that is dimensioned somewhat larger than the largest tool shank that the tool is designed to accommodate. A threaded bore 36 is formed in tail section 26 and is of a standard size to mate with the drive shaft of a powered or hand driver (not shown). The bores 34 and 36 may communicate at a central region 38 of body 14. While a threaded bore 36 is illustrated, such bore could be replaced with a tapered bore of a standard size to mate with a tapered drive shaft. Furthermore, body 14 may be formed integrally with the drive shaft.

Body 14 defines three passageways 40 to accommodate three jaws 22. Each jaw is separated from the adjacent jaw by an arc of approximately 120°. The axes of passageways 40 and jaws 22 are angled with respect to the chuck center axis 30 such that each passageway axis travels through axial bore 34 and intersects axis 30 at a common point ahead of the chuck body. The jaws form a grip that moves radially toward and away from the chuck axis to grip a tool, and each jaw 22 has a tool engaging face 42 generally parallel to the axis of chuck body 14. Threads 44, formed on the jaw's opposite or outer surface, may be constructed in any suitable type and pitch.

As illustrated in FIGS. 1 and 2, body 14 includes a thrust ring 46 that, in a preferred embodiment, may be integral with the body. It should be understood, however, that thrust ring 46 and body 14 may be separate components. Thrust ring 46 includes a plurality of jaw guideways 48 formed around its circumference to permit retraction of jaws 22 therethrough and also includes a ledge portion 50 to receive a bearing. Ledge portion 50 includes a first surface 47 and a second surface 49. First surface 47 extends radially outwardly, and is perpendicular to, longitudinal center axis 30 of the chuck body. Second surface 49 extends axially along, and is concentric about, longitudinal center axis 30 of the chuck body.

Body tail section 26 includes a knurled surface 54 that receives an optional rear sleeve 12 in a press fit. Rear sleeve 12 could also be retained by press fit without knurling, by use of a key or by crimping, staking, riveting, threading or any other suitable securing mechanism. Further, the chuck may be constructed with a single sleeve having no rear sleeve.

Figure 3:
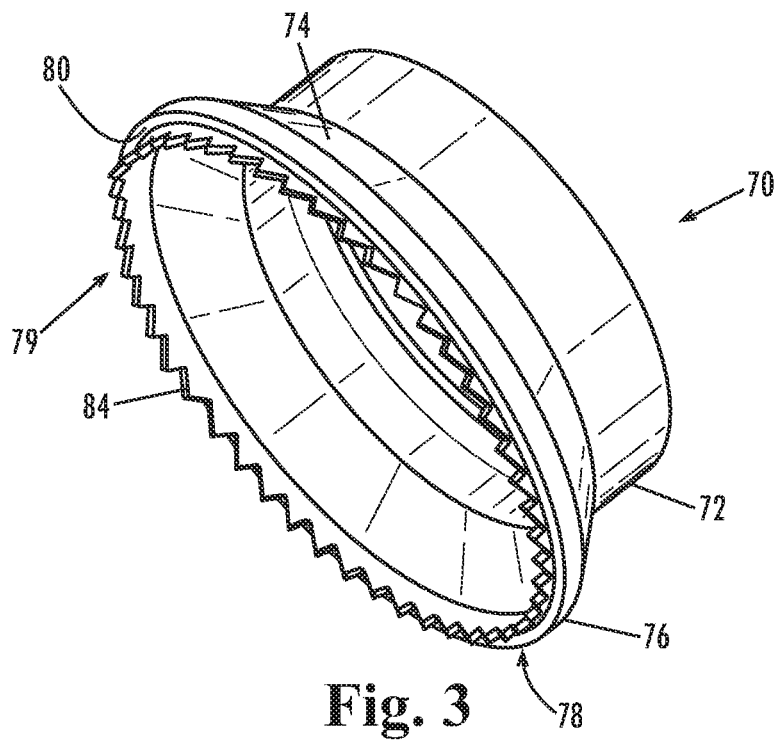
FIG. 3 is a perspective view of the nut retainer member of the chuck as shown in FIG. 1.

As best seen in FIG. 3, nut retainer member 70 includes a first generally cylindrical portion 72, a second generally cylindrical portion 76, and a frusto-conical portion 74 extending therebetween. First cylindrical portion 72 is configured to be press fit over nose section 24 in a location so that a rear edge 78 of second cylindrical portion 76 will engage nut 16 to prevent nut 16 from moving axially forward more than a desired amount. More specifically, rear edge 78 defines an annular engagement surface 80 that is configured to abut a forward axial face 17 of nut 16. This desired amount of axial movement can be determined by the location in which nut retainer member 70 is pressed onto the body member. It should be appreciated that although nut retainer member 70 is adapted to be press fit onto the nose portion of the body, it can be secured in any other suitable manner in accordance with the present disclosure. Additionally, rear edge 79 of nut retainer member 70 also defines an annular ratchet 79 including an array of locking teeth 84. Locking teeth 84 of the ratchet are disposed radially inwardly of annular engagement surface 80 and extend axially rearwardly from rear edge 78. As such, when annular engagement surface 80 is received on forward axial face 17 of nut 16, locking teeth 84 are disposed radially inwardly of, and extend axially rearwardly of, forward axial face 17 of the nut (FIGS. 6A and 6B).

Figure 4:
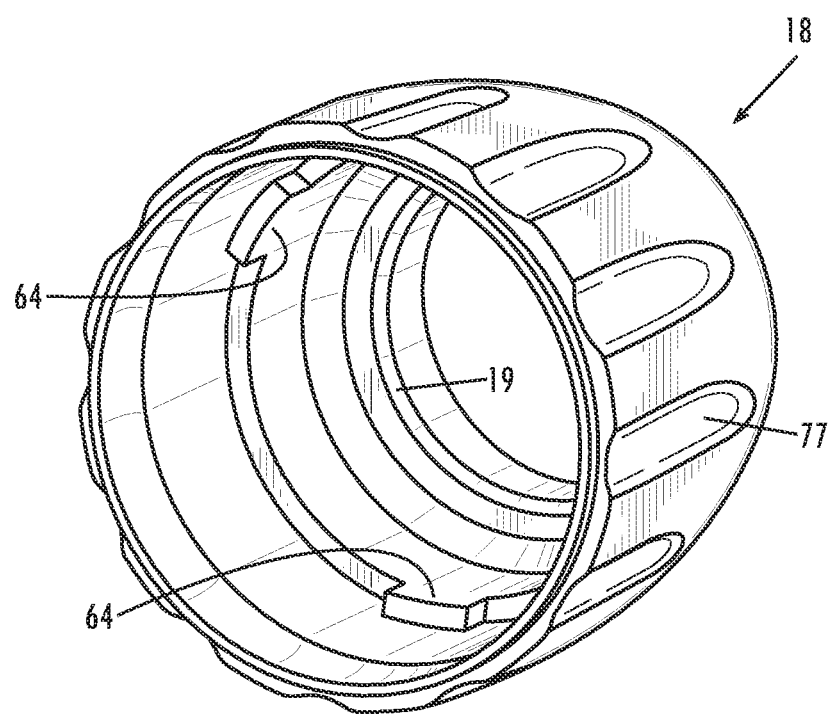
FIG. 4 is a perspective view of the front sleeve of the chuck as shown in FIG. 1.

Nose piece 20 is press fit to a cylindrical portion of body nose section 24 and retains front sleeve 18 against forward axial movement. As shown in FIGS. 1 and 4, front sleeve 18 includes an annular ledge 19 disposed about nose section 24 of body 14. Nose piece 20 is pressed onto nose section 24 such that annular ledge 19 is received in a gap formed between nose piece 20 and first cylindrical portion 72 of nut retainer member 70. It should be understood, however, that other methods of axially securing front sleeve 18 on the body may be used. For example, a snap ring, or the like, could be pressed on, or otherwise secured, such as in a corresponding groove, to body nose section 24 forward of front sleeve 18. In addition to maintaining front sleeve 18 on body 14, nose piece 20 also maintains front sleeve 18 in driving engagement with nut 16, as discussed in greater detail below. Nose piece 20 may be coated with a non-ferrous metallic coating to prevent rust and to enhance its appearance. Examples of suitable coatings include zinc or nickel, although it should be appreciated that any suitable coating could be utilized.

The outer circumferential surface of front sleeve 18 may be knurled or may be provided with longitudinal ribs 77 or other protrusions to enable the operator to grip it securely. In like manner, the circumferential surface of rear sleeve 12, if employed, may be knurled or ribbed as at 81 if desired. The front and rear sleeves may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials for which the chuck of the present invention is fabricated will depend on the end use of the chuck, and the above materials are provided by way of example only.

Figure 6:
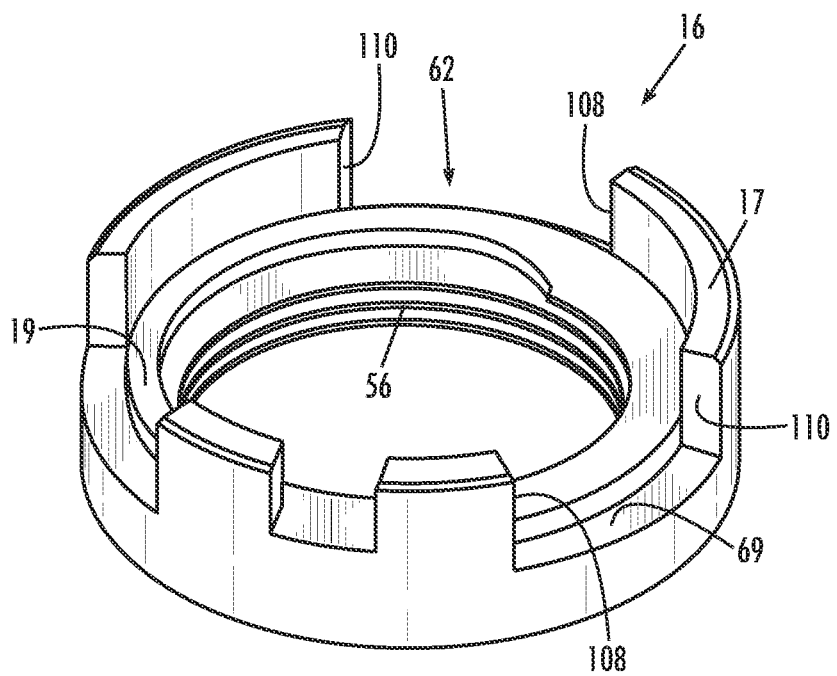
FIG. 6 is a perspective view of the nut of the chuck as shown in FIG. 1.

As illustrated in FIG. 6, nut 16 has threads 56 for mating with jaw threads 44. Nut 16 is positioned about the body in engagement with the jaw threads so that when the nut is rotated with respect to body 14, the jaws will be advanced or retracted depending on the nut's rotational direction. Additionally, the nut's forward axial face 17 includes recesses 62 that receive respective drive dogs 64 (FIG. 4) extending from the inner surface of front sleeve 18. Each recess 62 extends axially rearwardly of an inner support face 19 of nut 16 and terminates at a bottom wall 69 that is substantially transverse to longitudinal center axis 30 of the nut. The angular width of the drive dogs is less than that of the recesses, resulting in a range of relative rotational movement, for example between 16° and 20°, between the nut and the front sleeve. Additionally, each recess has a pair of opposed sidewalls 108 and 110 adapted to be selectively abutted by respective drive dogs 64.

Figure 5:
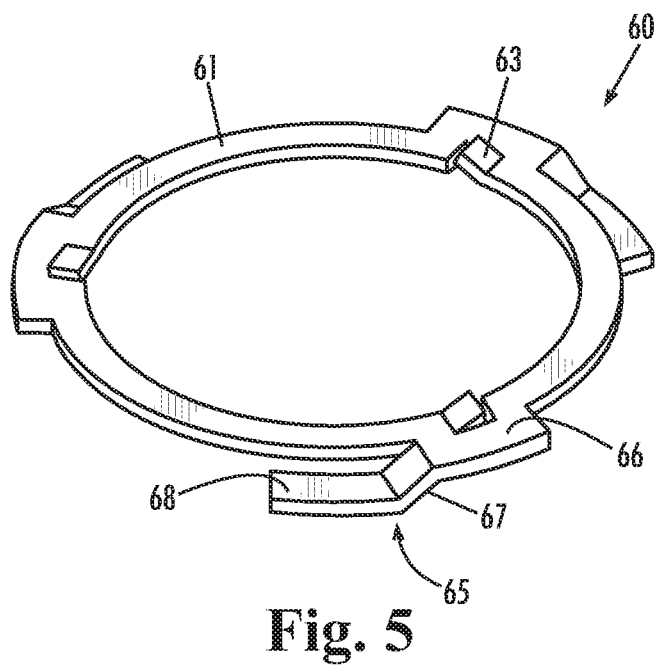
FIG. 5 is a perspective view of the lock ring of the chuck as shown in FIG. 1.

As best seen in FIG. 5, a lock ring 60 includes a planar ring portion 61, a plurality of locking pawls 63 and a plurality of drive pawls 65. Preferably, lock ring 60 includes three locking pawls 63 and three drive pawls 65, corresponding to the number of recesses 62 defined by nut 16. Each drive pawl 65 extends axially rearwardly from ring portion 61 and includes an upper proximal portion 66, a lower distal portion 68, and a camming surface 67, or ramp, extending therebetween. Locking pawls 63 extend axially forwardly of ring portion 61.

Figure 7A:
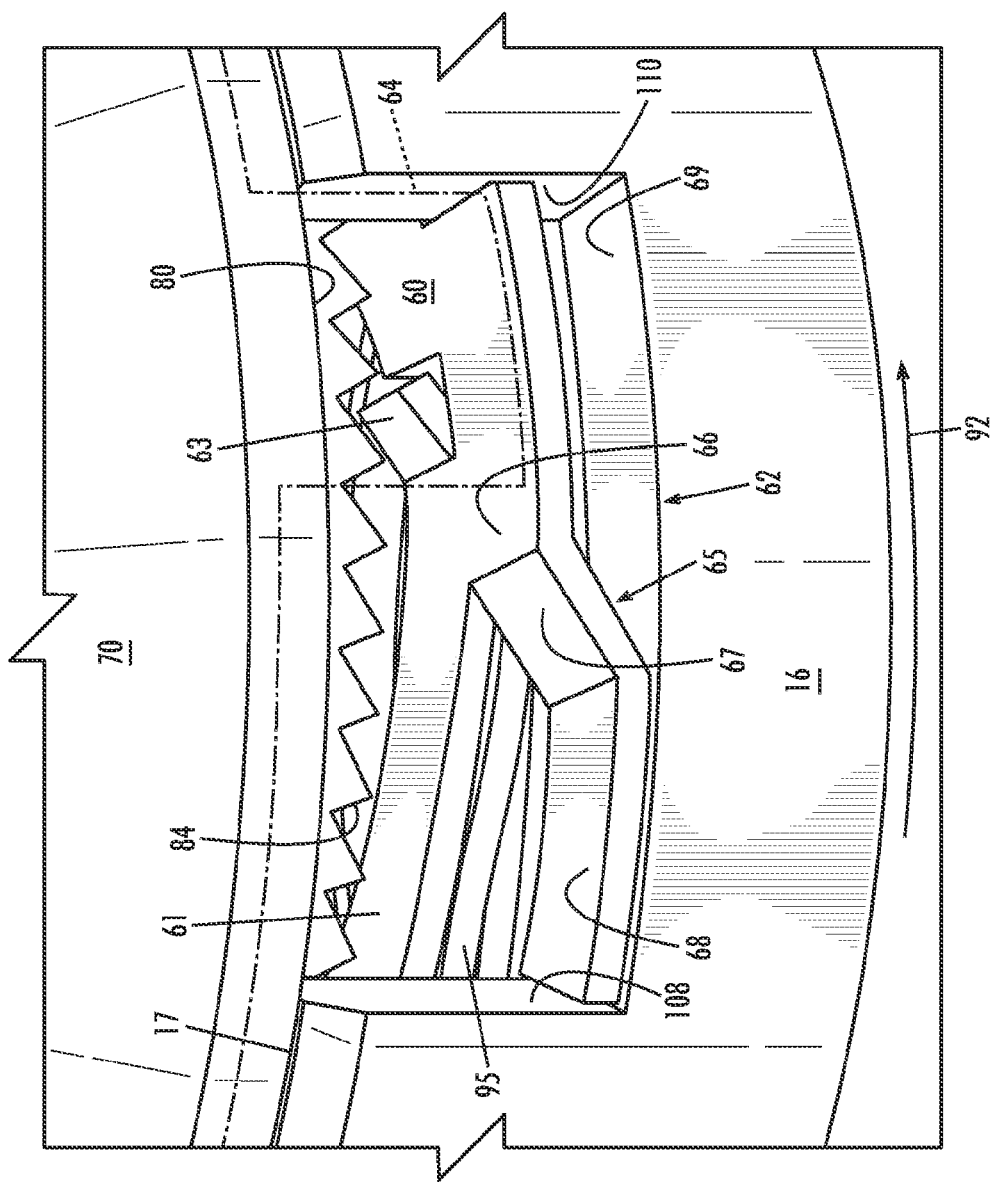
FIG. 7A is a partial perspective view of the nut, lock ring, wave spring and nut retainer member of the chuck as shown in FIG. 1.
Figure 7B:
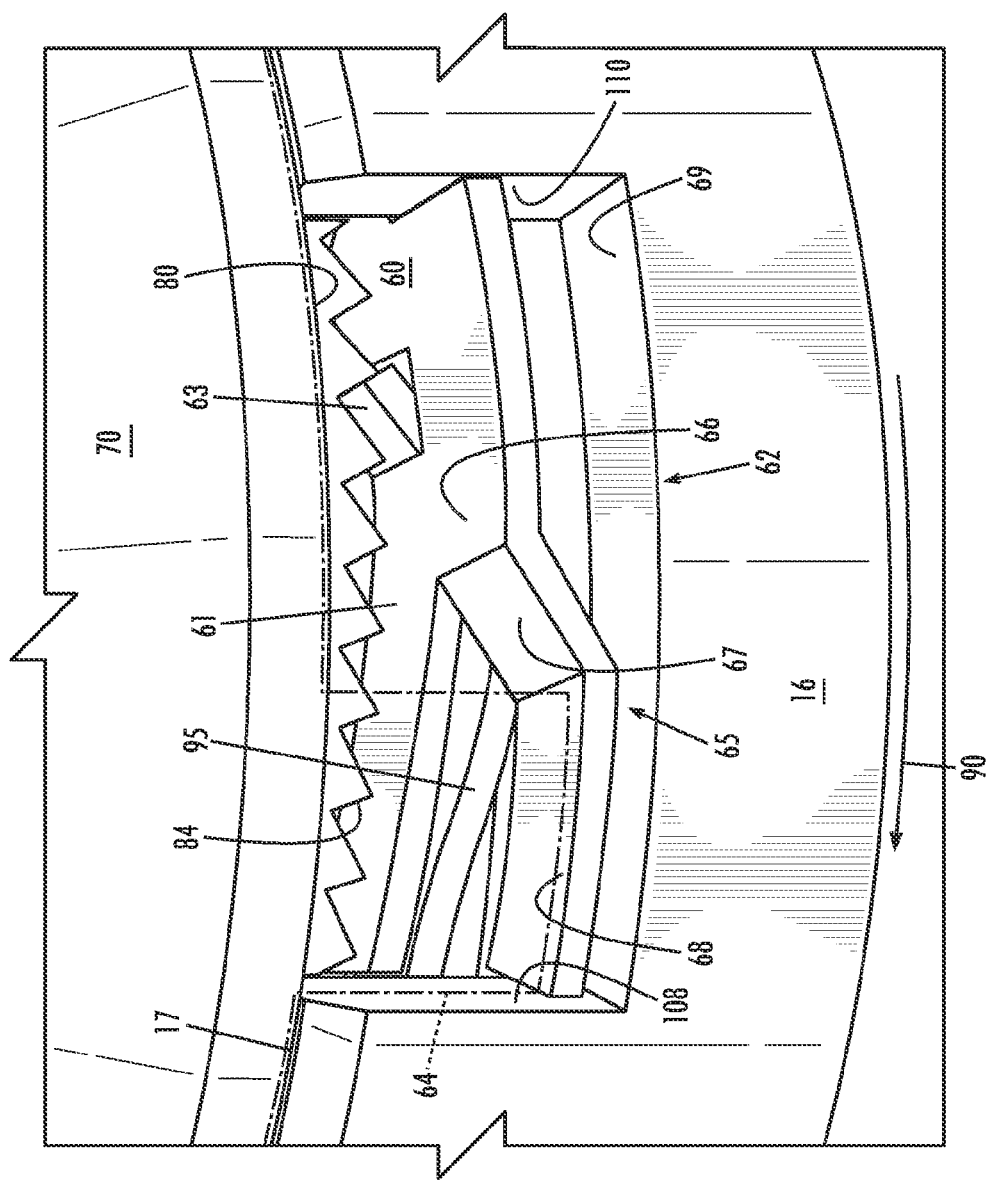
FIG. 7B is a partial perspective view of the nut, lock ring, wave spring and nut retainer member of the chuck as shown in FIG. 1.

As best seen in FIGS. 7A and 7B, each drive pawl 65 is received in a corresponding recess 62 of nut 16 such that lock ring 60 is non-rotatably fixed to nut 16. Note, however, it is preferable that the length of each drive pawl 65 in the circumferential direction be slightly less than the circumferential length of the corresponding recess 62 to allow for slight rotational tolerance between nut 16 and lock ring 60. Preferably, as discussed in greater detail below, drive pawls 65 do not make contact with bottom walls 69 of their corresponding recesses. Note, however, in alternate embodiments each drive pawl 65 makes contact with bottom wall 69 of the corresponding recesses 62 such that drive pawls 65 bias lock ring 60 axially forward relative to chuck body 14. As such, in those embodiments, drive pawls 65 assist spring washer 95 in urging locking pawls 63 toward engagement with locking teeth 84.

In addition to drive pawls 65, spring washer 95 is disposed between nut 16 and lock ring 60 and biases lock ring 60 axially forward relative to chuck body 14. As such, spring washer 95 also biases locking pawls 63 toward locking teeth 84. Spring washer 95 rests on inner support surface 19 of nut 16 and contacts a rear surface of ring portion 61 of lock ring 60. To disengage locking pawls 63 from locking teeth 84, the forward biasing force of spring washer 95 on lock ring 60 must be overcome, as discussed below.

A bearing washer 31 and an annular bearing cage 35 are received between thrust ring 46 of body 14 and nut 16. Bearing washer 31 is disposed adjacent first surface 47 of thrust ring 46, such that a plurality of bearing elements, in this case bearing balls 37, of bearing cage 35 make contact with its top surface and a bottom surface of nut 16.

As noted above and best seen in FIG. 3, nut retainer member 70 defines an annular ratchet 79 of locking teeth 84. In the illustrated embodiment, the locking teeth 84 of the ratchet are sawtooth-shaped disposed about the inner circumferential surface of rear edge 78 of the nut retainer member. Each tooth 84 has a first side with a slope approaching 90°. The second side has a lesser slope, which allows locking pawls 63 of lock ring 60 to slip over the teeth in the chuck's closing direction but not in the opposite opening direction. Locking pawls 63 are deflectable and generally disposed in alignment with the slope of the second side. Thus, rotation of nut 16, and therefore lock ring 60, in a direction 90 (FIG. 7B) with respect to nut retainer member 70 moves locking pawls 63 repeatedly over teeth 84, causing a clicking sound as locking pawls 63 fall against each subsequent tooth's second side. This configuration of teeth 84 and locking pawls 63, however, prevents the lock ring's rotation in an opposite direction 92 (FIG. 7A). Application of rotational force to lock ring 60 in this direction forces locking pawls 63 into the steep-sloped first sides of teeth 84. Since locking pawls 63 are generally perpendicular to the first sides, they do not deflect inward to permit rotation.

As discussed below, direction 90 corresponds to the chuck's closing direction, while direction 92 corresponds to the chuck's opening direction. Accordingly, when locking pawls 63 engage ratchet teeth 84, the teeth permit the lock ring's movement and, therefore, the nut's movement, in the chuck's closing direction but prevent its movement in the opening direction.

FIG. 7A illustrates the disposition of locking pawls 63 when first sleeve 18 is in a first of two positions with respect to nut 16, while FIG. 7B illustrates these components when the sleeve is in a second position with respect to the nut. For ease of illustration, both figures omit the front sleeve. Referring to FIG. 4 and to the sleeve's second position as shown in FIG. 7B, each drive dog 64 of the sleeve is disposed against or adjacent to a side 108 of the nut recess 62 in which is it received. Accordingly, each drive dog 64 is disposed above the lower distal portion 68 of its respective drive pawl 65. As such, wave spring 95 is able to bias lock ring 60 axially forward relative to body 14 such that each locking pawl 63 engages ratchet teeth 84, meaning lock ring 60, and therefore nut 16, can only rotate in closing direction 90 with respect to body 14.

Referring now to FIG. 7A, when the front sleeve 18 moves in opening direction 92 with respect to nut 16, each drive dog 64 moves from lower distal portion 68 of drive pawl 65 to upper proximal portion 66. In so doing, each drive dog 64 acts as cam on the corresponding drive pawl's 65 camming surface 67, thereby urging lock ring 60 rearwardly against the forward biasing force of the wave spring. As such, locking pawls 63 are disengaged from locking teeth 84 and nut 16 is free to rotate with respect to the chuck's body in both the opening direction 92 and closing direction 90. Note, inadvertent rotation of sleeve 18 in opening direction 92 relative to nut 16, and subsequent unlocking of the chuck, is prevented by the forward biasing force of wave spring 95 on lock ring 60 and abutment of drive dog 64 with camming surface 67. As such, to unlock the chuck, a user must exert sufficient rotational torque in opening direction 92 on sleeve 18 to cause drive dog 64 to "ride up" camming surface 67, thereby overcoming the biasing force of wave spring 95.

As well, when sleeve 18 rotates in direction 92 so that the lock ring 60 moves from the position shown in FIG. 7B to the position shown in FIG. 7A, drive dogs 64 move within recesses 62 of nut 16 so that each drive dog is against or immediately adjacent to a side 110 of the groove.

In operation, and referring to FIGS. 4, 6, 7A and 7B, recesses 62 receive drive dogs 64 when the chuck is between fully opened and fully closed positions so that the drive dogs are adjacent groove sides 110 (FIG. 7A). As such, drive dogs 64 are disposed on upper proximal portions 66 of the respective drive pawls 65 such that lock ring 60 is urged rearwardly and locking pawls 63 are disengaged from locking teeth 84. That is, sleeve 18 is in the first position with respect to the nut. In this condition, frictional forces between the top surfaces of upper proximal portions 66 of drive pawls 65 and the bottom surfaces of the respective drive dogs rotationally fix the front sleeve to nut 16 such that an operator rotating sleeve 18 rotationally drives the nut through lock ring 60, thereby opening or closing the jaws. When the operator rotates the sleeve/lock ring/nut in the closing direction 90, as shown in FIG. 7B, to the point that the jaws tighten onto a tool shank, the nut is urged rearward up the jaw threads, thereby pushing the nut against bearing cage 35, bearing washer 31 and thrust ring 46. The rearward force creates a frictional lock between the nut and the chuck body.

The wedge between the nut threads and jaw threads increasingly resists the nut's rotation. When the operator continues to rotate sleeve 18, and the resistance overcomes the hold provided by the frictional forces between drive dogs 64 and upper portions 66 of drive pawls 65, sleeve 18 rotates with respect to nut 16 and lock ring 60. This moves drive dogs 64 from sides 110 of recesses 62 to sides 108 and, subsequently, down the respective camming surfaces 67 of drive pawls 65 to the lower portions 68. As shown in FIG. 7B, in this position, a gap exists between each drive dog 64 and the top surface of the respective lower portion 68. As such, rearward force from drive dogs 64 on drive pawls 65 is released and lock ring 60 is urged axially forward by wave spring 30, thereby engaging locking pawls 63 with ratchet teeth 84. At this point, lock ring 60, and therefore nut 16, is rotationally locked to nut retainer member 70, and therefore body 14, against rotation in the chuck's opening direction. That is, the nut is rotationally locked to the chuck body in the opening direction. Since the nut's rotation with respect to the body is necessary to open the chuck, this prevents inadvertent opening during use.

Lock ring 60, and therefore nut 16, may, however, still rotate with respect to nut retainer member 70, and therefore body 14, in the chuck's closing direction. During such rotation, sleeve 18 drives nut 16 through drive dogs 64 against groove sides 108. This continues to tighten the chuck and, as described above, produces a clicking sound to notify the operator that the chuck is in a fully tightened position.

To open the chuck, the operator rotates sleeve 18 in the opposite direction. Because locking pawls 63 engage locking teeth 84 of nut retainer member 70, which is rotationally fixed to the body, the lock ring 60 cannot rotate with the sleeve. Thus, upon application of sufficient torque in the opening direction, sleeve 18 moves with respect to the lock ring and the nut. This rotation moves drive dogs 64 back up onto camming surfaces 67 of drive pawls 65, thereby urging lock ring 60 rearwardly relative to body 14 and disengaging locking pawls 63 from ratchet teeth 84 as drive dogs 64 move from sides 108 to sides 110 of recesses 62. Thus, the sleeve moves to its first position with respect to the nut, as shown in FIG. 7A, and the lock ring and nut are free to rotate with respect to the chuck body. Accordingly, further rotation of sleeve 18 in the opening direction moves jaws 22 away from the chuck axis, thereby opening the chuck. The amount of torque required to rotate sleeve 18 relative to nut 16 in the opening direction is dependent upon the amount of forward biasing force exerted on lock ring 60 by wave spring 95, the slope of drive pawl's camming surface 67, and the amount of sliding friction between drive dog 64 and the camming surface.

While one or more preferred embodiment of the present invention have been described above, it should be understood that any and all equivalent realizations of the present invention are included within the scope and spirit thereof. Thus, the depicted embodiment(s) are presented by way of example only and are not intended as limitations on the present invention. It should be understood that aspects of the various one or more embodiments may be interchanged both in whole or in part. Therefore, it is contemplated that any and all such embodiments are included in the present invention as may be fall within the literal or equivalent scope of the appended claims.

What is claimed is:

1. A chuck for use with a manual or powered driver having a rotatable drive shaft, the chuck comprising:
    a body having a nose section, a tail section and a center axis, the tail section being configured to rotate with the drive shaft and the nose section having an axial bore formed therein and a plurality of passageways formed therethrough and intersecting the axial bore;
    a plurality of jaws movably disposed in the passageways;
    a nut rotatably mounted about the body and in operative communication with the jaws so that rotation of the nut in a closing direction with respect to the body moves the jaws toward the center axis of the body and rotation of the nut in an opening direction with respect to the body moves the jaws away from the center axis of the body;
    a sleeve rotatably mounted about the body, the sleeve being in operative communication with the nut so that the sleeve is rotatable with respect to the nut between a first rotational position and a second rotational position;
    an annular array of locking teeth non-rotatably fixed to the body and facing toward the tail section of the body; and
    a lock ring comprising an annular portion and at least one projection extending from the annular portion toward the nose section of the body and the locking teeth, the lock ring being axially movable with respect to the body to engage the at least one projection to the locking teeth when the sleeve is in the second rotational position, and to disengage the at least one projection from the locking teeth when the sleeve is in the first rotational position,
    wherein the sleeve includes a drive dog bounding rotational movement of the sleeve between the first rotational position and the second rotational position.

2. The chuck as in claim 1, wherein the lock ring is axially movable between a first axial position in which the at least one projection engages the locking teeth when the sleeve is in the second rotational position and a second axial position with respect to the body in which the at least one projection is disengaged from the locking teeth when the sleeve is in the first rotational position.

3. The chuck as in claim 2, wherein the drive dog engages a camming surface of the lock ring to transition the lock ring from the first axial position to the second axial position.

4. The chuck as in claim 3, wherein the drive dog overcomes a forward biasing force exerted by a wave spring to move the lock ring to the second axial position.

5. The chuck as in claim 4, wherein the wave spring contacts a first side of the lock ring and the at least one projection extends away from a second side of the lock ring opposite the first side.

6. The chuck as in claim 4, wherein the wave spring contacts a first side of the lock ring and the at least one projection extends away from a second side of the lock ring opposite the first side.

7. The chuck as in claim 3, wherein the camming surface is provided between an upper proximal portion and a lower distal portion of a drive pawl formed on the lock ring.

8. The chuck as in claim 7, wherein the drive pawl extends between sides of a recess formed in the nut to hold the lock ring non-rotatable with respect to the nut.

9. The chuck as in claim 3, wherein the drive dog overcomes a forward biasing force exerted by a wave spring to move the lock ring to the second axial position.

10. The chuck as in claim 2, wherein the drive dog disengages a camming surface of the lock ring to transition the lock ring from the second axial position to the first axial position.

11. The chuck as in claim 2, wherein the drive dog engages a camming surface of the lock ring to transition the lock ring from the first axial position to the second axial position.

12. The chuck as in claim 11, wherein the camming surface is provided between an upper proximal portion and a lower distal portion of a drive pawl formed on the lock ring.

13. The chuck as in claim 12, wherein the drive pawl extends between sides of a recess formed in the nut to hold the lock ring non-rotatable with respect to the nut.

14. The chuck as in claim 1, wherein the at least one projection and the locking teeth are configured so that when the at least one projection engages the locking teeth, the at least one projection and the locking teeth permit the lock ring to rotate in the closing direction with respect to the body.

15. The chuck as in claim 1, wherein the at least one projection and the locking teeth are configured to resist rotation of the lock ring in the opening direction in response to the at least one projection engaging the locking teeth.

16. The chuck as in claim 1, wherein the sleeve is movable between a first rotational position in which the at least one projection disengages the locking teeth when the lock ring is in the second axial position and a second rotational position in which the at least one projection is engaged to the locking teeth when the lock ring is in the first axial position.

17. The chuck as in claim 16, wherein the drive dog disengages a camming surface of the lock ring to transition the lock ring from the second axial position to the first axial position.

18. A chuck for use with a manual or powered driver having a rotatable drive shaft, the chuck comprising:
- a body having a nose section, a tail section and a center axis, the tail section being configured to rotate with the drive shaft and the nose section having an axial bore formed therein and a plurality of passageways formed therethrough and intersecting the axial bore;
- a plurality of jaws movably disposed in the passageways;
- a nut rotatably mounted about the body and in operative communication with the jaws so that rotation of the nut in a closing direction with respect to the body moves the jaws toward the center axis of the body and rotation of the nut in an opening direction with respect to the body moves the jaws away from the center axis of the body;
- a sleeve rotatably mounted about the body, the sleeve being in operative communication with the nut so that the sleeve rotationally drives the nut but is rotatable with respect to the nut;
- an annular array of locking teeth non-rotatably fixed to the body and facing toward the tail section of the body; and
- a lock ring comprising an annular portion and at least one projection extending from the annular portion toward the nose section of the body and the locking teeth, the lock ring being axially movable with respect to the body between a first axial position and a second axial position to engage the at least one projection to the locking teeth when the lock ring is in the first axial position, and to disengage the at least one projection from the locking teeth when the lock ring is in the second axial position,
- wherein the sleeve includes a drive dog bounding rotational movement of the sleeve as the lock ring moves between the first axial position and the second axial position.

19. The chuck as in claim 18, wherein the at least one projection and the locking teeth are configured so that when the at least one projection engages the locking teeth, the at least one projection and the locking teeth permit the lock ring to rotate in the closing direction with respect to the body.

20. The chuck as in claim 18, wherein the at least one projection and the locking teeth are configured to resist rotation of the lock ring in the opening direction in response to the at least one projection engaging the locking teeth.

* * * * *